(12) United States Patent
Du et al.

(10) Patent No.: US 12,494,888 B2
(45) Date of Patent: Dec. 9, 2025

(54) CELL ACTIVATION TRIGGERED LAYER 3 REPORTING

(71) Applicant: Nokia Technologies Oy, Espoo (FI)

(72) Inventors: Lei Du, Beijing (CN); Parham Kazemi, Espoo (FI); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/058,852

(22) Filed: Feb. 20, 2025

(65) Prior Publication Data

US 2025/0317260 A1 Oct. 9, 2025

(30) Foreign Application Priority Data

Apr. 8, 2024 (WO) ................. PCT/CN2024/086654

(51) Int. Cl.
*H04L 5/00* (2006.01)
*H04W 24/10* (2009.01)

(52) U.S. Cl.
CPC ........... *H04L 5/0098* (2013.01); *H04W 24/10* (2013.01)

(58) Field of Classification Search
CPC .............................. H04L 5/0098; H04W 24/10
See application file for complete search history.

(56) References Cited

U.S. PATENT DOCUMENTS

| | | | | |
|---|---|---|---|---|
| 2021/0251040 A1* | 8/2021 | Tang | .................... | H04W 56/001 |
| 2022/0046735 A1* | 2/2022 | Wang | .................... | H04L 5/0053 |

(Continued)

FOREIGN PATENT DOCUMENTS

| | | |
|---|---|---|
| CN | 114982329 A | 8/2022 |
| WO | WO-2024030502 A1 * | 2/2024 |
| WO | 2024/065791 A1 | 4/2024 |

OTHER PUBLICATIONS

"3rd Generation Partnership Project; Technical Specification Group Radio Access Network; NR; Requirements for support of radio resource management (Release 18)", 3GPP TS 38.133, V18.4.0, Dec. 2023, 5778 pages.

(Continued)

*Primary Examiner* — Mohammad S Adhami
*Assistant Examiner* — Raul Rivas
(74) *Attorney, Agent, or Firm* — SQUIRE PATTON BOGGS (US) LLP

(57) ABSTRACT

Embodiments of the present disclosure disclose devices, methods and apparatuses for cell activation triggered layer 3 (L3) reporting. In an aspect, a terminal device receives a cell activation command to activate a plurality of cells in a frequency band. Based on status of the plurality of cells and association information between cells comprising at least the plurality of cells to be activated in the frequency band, the terminal device determines whether L3 reporting is to be triggered. Based on determining that the L3 reporting is to be triggered, the terminal device transmits an L3 report. By considering the cell status e.g. known/unknown, and the association information among the cells on the same band, the terminal device may determine if L3 reporting is to be triggered for cells on different frequency bands, for example, on frequency range 1(FR1) and frequency range 2(FR2), respectively, and hence achieves a faster cell activation.

20 Claims, 4 Drawing Sheets

(56) References Cited

U.S. PATENT DOCUMENTS

2024/0063991 A1* 2/2024 Liu ..................... H04L 5/0094
2024/0357513 A1* 10/2024 Shen ..................... H04L 5/00
2025/0081283 A1* 3/2025 Liu ..................... H04W 76/28

OTHER PUBLICATIONS

"Big CR to TS 38.133 on R18 SCell activation enhancement maintenance", 3GPP TSG-RAN WG4 Meeting #110, R4-2402621, Apple, Feb. 26-Mar. 1, 2024, 27 pages.
"WF for [110][207] NR_RRM_enh3_part1", 3GPP TSG-RAN WG4 Meeting #110, R4-2403466, Agenda: 8.4.5, Apple, Feb. 26-Mar. 1, 2024, 5 pages.
PCT Application No. PCT/CN2023/122343, "Cell Activation", filed on Sep. 27, 2023, pp. 1-36.
"38.133 draftCR on multiple SCell activation with L3 reporting", 3GPP TSG-RAN WG4 Meeting #110bis, R4-24xxxxxx, Nokia, Apr. 15-19, 2024, 5 pages.
"Maintenance on FR2 SCell activation delay reduction", 3GPP TSG-RAN WG4 Meeting #110bis, R4-24xxxxx, Agenda: 6.4.1, Nokia, Apr. 15-19, 2024, 3 pages.
"Open issues on FR2 SCell activation delay reduction", 3GPP TSG-RAN WG4 Meeting #110bis, R4-24xxxxx, Agenda: x.4.1, Nokia, Apr. 15-19, 2024, 4 pages.
"IEEE 802.11", Wikipedia, Retrieved on Mar. 13, 2025, Webpage available at : https://en.wikipedia.org/wiki/IEEE_802.11.
International Search Report and Written Opinion received for corresponding Patent Cooperation Treaty Application No. PCT/CN2024/086654, dated Dec. 23, 2024, 9 pages.

* cited by examiner

CELL ACTIVATION TRIGGERED LAYER 3 REPORTING

CROSS-REFERENCE TO RELATED APPLICATION

This application claims the benefit of PCT Application No. PCT/CN2024/086654, filed Apr. 8, 2024, the contents of which are hereby incorporated by reference in their entirety.

FIELD

Embodiments of the present disclosure generally relate to the field of communication, and in particular, to devices, methods, apparatuses and a computer readable storage medium for cell activation triggered layer 3 (L3) reporting.

BACKGROUND

A communication network can be seen as a facility that enables communications between two or more communication devices, or provides communication devices access to a data network. A mobile or wireless communication network is one example of a communication network.

Such communication networks operate in according with standards such as those provided by 3GPP (Third Generation Partnership Project) or ETSI (European Telecommunications Standards Institute). Examples of standards are the so-called 5G (5th Generation) standards provided by 3GPP.

SUMMARY

In general, example embodiments of the present disclosure provide a solution for cell activation triggered L3 reporting, especially in a multiple secondary cell (SCell) activation scenario.

In a first aspect, there is provided a terminal device. The terminal device comprises at least one processor and at least one memory storing instructions that, when executed by the at least one processor, cause the terminal device at least to: receive a cell activation command to activate a plurality of cells in a frequency band; determine, based on status of the plurality of cells and association information between cells comprising at least the plurality of cells to be activated in the frequency band, whether layer 3 (L3) reporting is to be triggered; and transmit an L3 report based on determining that the L3 reporting is to be triggered.

In a second aspect, there is provided a network device. The network device comprises at least one processor and at least one memory storing instructions that, when executed by the at least one processor, cause the network device at least to: transmit, to a terminal device, a cell activation command to activate a plurality of cells in a frequency band; determine, based on status of the plurality of cells and association information between cells comprising at least the plurality of cells to be activated in the frequency band, whether layer 3 (L3) reporting is to be triggered by the terminal device; and receive, from the terminal device, an L3 report based on determining that the L3 reporting is to be triggered by the terminal device.

In a third aspect, there is provided a method. The method comprises: receiving a cell activation command to activate a plurality of cells in a frequency band; determining, based on status of the plurality of cells and association information between cells comprising at least the plurality of cells to be activated in the frequency band, whether layer 3 (L3) reporting is to be triggered; and transmitting an L3 report based on determining that the L3 reporting is to be triggered.

In a fourth aspect, there is provided a method. The method comprises: transmitting, to a terminal device, a cell activation command to activate a plurality of cells in a frequency band; determining, based on status of the plurality of cells and association information between cells comprising at least the plurality of cells to be activated in the frequency band, whether layer 3 (L3) reporting is to be triggered by the terminal device; and receiving, from the terminal device, an L3 report based on determining that the L3 reporting is to be triggered by the terminal device.

In a fifth aspect, there is provided an apparatus. The apparatus comprises: means for receiving a cell activation command to activate a plurality of cells in a frequency band; means for determining, based on status of the plurality of cells and association information between cells comprising at least the plurality of cells to be activated in the frequency band, whether layer 3 (L3) reporting is to be triggered; and means for transmitting an L3 report based on determining that the L3 reporting is to be triggered.

In a sixth aspect, there is provided an apparatus. The apparatus comprises: means for transmitting, to a terminal device, a cell activation command to activate a plurality of cells in a frequency band; means for determining, based on status of the plurality of cells and association information between cells comprising at least the plurality of cells to be activated in the frequency band, whether layer 3 (L3) reporting is to be triggered by the terminal device; and means for receiving, from the terminal device, an L3 report based on determining that the L3 reporting is to be triggered by the terminal device.

In a seventh aspect, there is provided a non-transitory computer readable medium comprising program instructions for causing an apparatus to perform at least the method according to third or fourth aspect.

In an eighth aspect, there is provided a computer program comprising instructions, which, when executed by an apparatus, cause the apparatus at least to perform at least the method according to third or fourth aspect.

In a ninth aspect, there is provided a terminal device. The terminal device comprises: receiving circuitry for receiving a cell activation command to activate a plurality of cells in a frequency band; determining circuitry for determining, based on status of the plurality of cells and association information between cells comprising at least the plurality of cells to be activated in the frequency band, whether layer 3 (L3) reporting is to be triggered; and transmitting circuitry for transmitting an L3 report based on determining that the L3 reporting is to be triggered.

In a tenth aspect, there is provided a network device. The network device comprises: transmitting circuitry for transmitting, to a terminal device, a cell activation command to activate a plurality of cells in a frequency band; determining circuitry for determining, based on status of the plurality of cells and association information between cells comprising at least the plurality of cells to be activated in the frequency band, whether layer 3 (L3) reporting is to be triggered by the terminal device; and receiving circuitry for receiving, from the terminal device, an L3 report based on determining that the L3 reporting is to be triggered by the terminal device.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar element.

DETAILED DESCRIPTION

Figure 1:
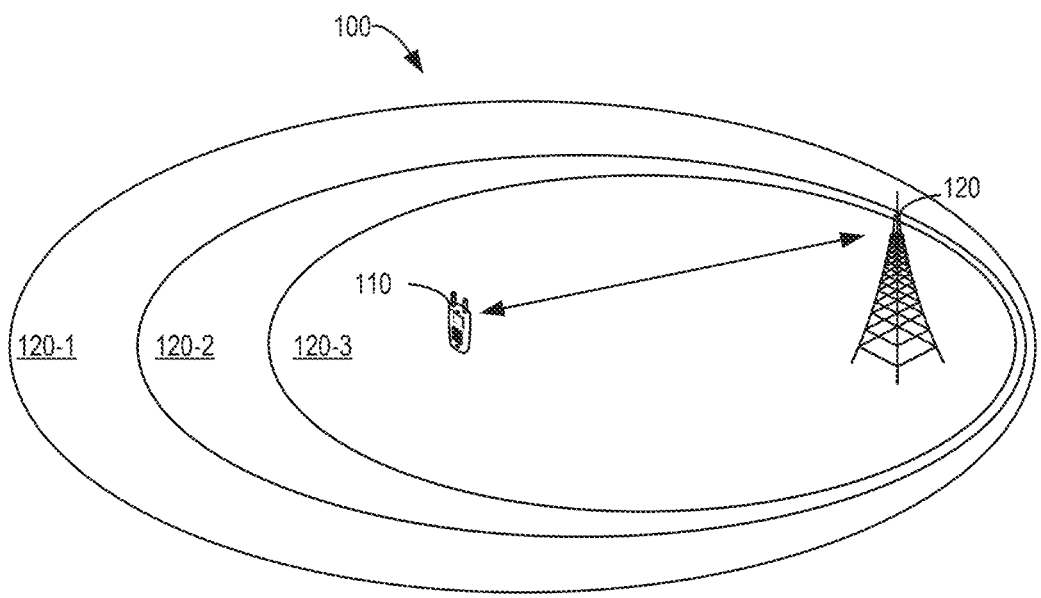
FIG. 1 illustrates an example network environment in which example embodiments of the present disclosure may be implemented.

Principles of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein may be implemented in various manners other than the ones described below.

In the following description and claims, unless defined otherwise, all technical and scientific terms used herein have the same meaning as commonly understood by one of ordinary skills in the art to which the present disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It may be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s) that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as long term evolution (LTE), LTE-advanced (LTE-A), wideband code division multiple access (WCDMA), high-speed packet access (HSPA), narrow band Internet of things (NB-IoT) and so on. Furthermore, the communications between a terminal device and a network device in the communication network may be performed according to any suitable generation communication protocols, including, but not limited to, the third generation (3G), the fourth generation (4G), 4.5G, the fifth generation (5G) communication protocols, and/or beyond. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a remote radio unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In new radio (NR)—as in LTE, a secondary cell (SCell) can be activated or deactivated. The transitions between activated and deactivated status are mainly based on media access control (MAC) control elements commands from the network e.g. the SCell activation/deactivation command. When the UE activates a deactivated SCell, it takes time i.e. activation delay $T_{activation\_time}$ to transition from deactivated status to activated status.

Thus, in Release 18, the SCell activation triggered the layer 3 (L3) reporting solution was introduced to reduce the SCell activation delay for activating an unknown SCell. This introduced idea is to allow the UE to send a L3 measurement reporting after SCell activation command if there is any valid L3 measurement results at the time of SCell activation. Then, it was further agreed to apply the SCell activation triggered L3 reporting to multiple SCell activation, and defined the conditions i.e. application conditions for multiple SCell activation delay requirement, and this means the UE may trigger the L3 reporting after SCell activation command when these conditions are fulfilled.

For example, the conditions for multiple SCell activation delay requirement may be defined as follows:
The delay within which the UE shall be able to activate the deactivated SCell with other downlink to-be-activated SCell(s) depends upon the specified conditions:

Any to-be-activated SCell is unknown and in the same band, and

No any active serving cell(s) or known to-be-activated SCell(s) exists on the same band, and the UE reports valid L3 measurement results after receiving the multiple SCell activation command for unknown SCell.

However, these conditions may be too restricted for activating multiple SCells on same frequency (FR) 1 band. Current conditions require all the to-be-activated SCells are unknown. This rules out the scenario where some SCells are known, and others SCells are unknown where the UE may still perform cell detection for these unknown SCells and hence L3 report is expected to reduce the activation delay.

In view of the above, some embodiments of the present disclosure propose a solution for cell activation triggered L3 reporting, especially in a multiple secondary cell (SCell) activation scenario. In some embodiments, a terminal device receives a cell activation command to activate a plurality of cells in a frequency band. Based on status of the plurality of cells and association information between cells comprising at least the plurality of cells to be activated in the frequency band, the terminal device determines whether layer 3 (L3) reporting is to be triggered. Based on determining that the L3 reporting is to be triggered, the terminal device transmits an L3 report after receiving the SCell activation command. By considering the cell status e.g. known/unknown and the association information among the cells on the same band, the terminal device may determine if L3 reporting is to be triggered for cells on different frequency bands, for example, on frequency range 1 (FR1) and frequency range 2 (FR2), respectively, and hence achieves a faster cell activation.

For illustrative purposes, principle and example embodiments of the present disclosure for cell activation triggered L3 reporting will be described below with reference to FIGS. 1-8. However, it is to be noted that these embodiments are given to enable the skilled in the art to understand inventive concepts of the present disclosure and implement the solution as proposed herein, and not intended to limit scope of the present application in any way.

FIG. 1 illustrates an example network environment 100 in which example embodiments of the present disclosure may be implemented. The environment 100, which may be a part of a communication network, includes terminal devices and network devices.

As illustrated in FIG. 1, the communication network 100 may include a terminal device 110 (hereinafter may also be referred to as a user equipment (UE) 110). The communication network 100 may further include a network device 120, which can provide a plurality of cells, 120-1, 120-2, 120-3, in which, one of the plurality of cells may be a primary cell (PCell), and the others may be secondary cells (SCells). PCells and SCells are closely related to carrier aggregation (CA) technology, evolved universal terrestrial radio access network (E-UTRAN)-new radio (NR) double connection (EN-DC) technology, or NE-DC technology. In EN-DC, NE-DC or NR-DC scenarios, there may be additionally a primary secondary cell (PSCell). For example, the purpose of carrier aggregation (CA) technology is to meet higher data transmission rate requirements by aggregating two or more carrier units (for example, component carrier, CC) to support larger transmission bandwidth. In this technology, PCell and SCell are united through carrier aggregation to jointly provide greater bandwidth and higher data transmission rates. In EN-DC, NE-DC or NR-DC technology, PSCell and SCell are united through carrier aggregation to jointly provide greater bandwidth and higher data transmission rates.

The PCell is the cell where the UE performs initial connection establishment, or the cell where the radio resource control (RRC) connection is reestablished, or the primary cell designated during the handover process. PCell is responsible for most of the RRC communication with UE. The SCell is added during RRC reconfiguration to provide additional wireless resources.

It is to be understood that the number of network devices and terminal devices is given only for the purpose of illustration without suggesting any limitations. The system 100 may include any suitable number of network devices and/or terminal devices adapted for implementing embodiments of the present disclosure. Although not shown, it would be appreciated that one or more terminal devices may be located in the environment 100.

Communications in the network environment 100 may be implemented according to any proper communication protocol(s), comprising, but not limited to, the third generation (3G), the fourth generation (4G), the fifth generation (5G) or beyond, wireless local network communication protocols such as institute for electrical and electronics engineers (IEEE) 802.11 and the like, and/or any other protocols currently known or to be developed in the future. Moreover, the communication may utilize any proper wireless communication technology, comprising but not limited to: multiple-input multiple-output (MIMO), orthogonal frequency division multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), carrier aggregation (CA), dual connection (DC), and new radio unlicensed (NR-U) technologies.

As mentioned above, in NR—as in LTE, a SCell can be activated or deactivated. The transitions between activated and deactivated status are mainly based on media access control (MAC) control elements commands from the network e.g. the SCell activation/deactivation command. When the UE activates a deactivated SCell, it takes time i.e. activation delay $T_{activation\_time}$ to transition from deactivated status to activated status.

Thus, in Release 18, the SCell activation triggered L3 reporting solution was introduced to reduce the SCell activation delay for activating an unknown SCell. This introduced idea is to allow the UE to send a L3 measurement reporting after SCell activation command if there is any valid L3 measurement results at the time of SCell activation.

Then, it is possible to apply the SCell activation triggered L3 reporting to multiple SCell activation, and the scenario may be further simplified with the limitation that all to-be-activated SCells are on the same band. For example, requirements may be defined for multiple SCell activation (with and without PUCCH SCell) considering at least enhancement of L3 measurement reporting triggered by SCell activation command when all to-be-activated SCells are in the same band.

That is to say, on top of single SCell activation with L3 reporting, the delay requirements may be defined for activating multiple downlink SCells with L3 reporting, assuming all the to-be-activated SCells are on the same band. This means that the UE may trigger the L3 reporting after SCell activation command when these conditions are fulfilled, and if the conditions are not fulfilled, the UE is not expected to send L3 reporting and the multiple SCell activation delay requirements with L3 reporting would not apply. Instead the legacy multiple SCell activation delay requirement shall apply.

Accordingly, there may be some conditions for multiple SCell activation delay requirement, for example:
The delay within which the UE shall be able to activate the deactivated SCell with other downlink to-be-activated SCell(s) depends upon the specified conditions:
  Any to-be-activated SCell is unknown and in the same band, and
  No any active serving cell(s) or known to-be-activated SCell(s) exists on the same band, and
  the UE reports valid L3 measurement results after receiving the multiple SCell activation command for unknown SCell.

For single SCell activation with L3 reporting, the UE may trigger the L3 report if the SCell is unknown. Based on this, for multiple SCell activation on the same band, it requires "any to-be-activated SCell is unknown" when triggering the L3 report.

These conditions for multiple SCell activation delay requirement may be too restricted for multiple SCells on same FR1 band. Current conditions require all the to-be-activated SCells are unknown. This rules out the scenario where some SCells are known, and others are unknown where the UE may still perform cell detection for these unknown SCells and hence the L3 report is expected to reduce the activation delay. Therefore, there is a need for the improved conditions for defining when the L3 report will be triggered when SCell activation command is received for activating at least one unknown SCell.

Figure 2:
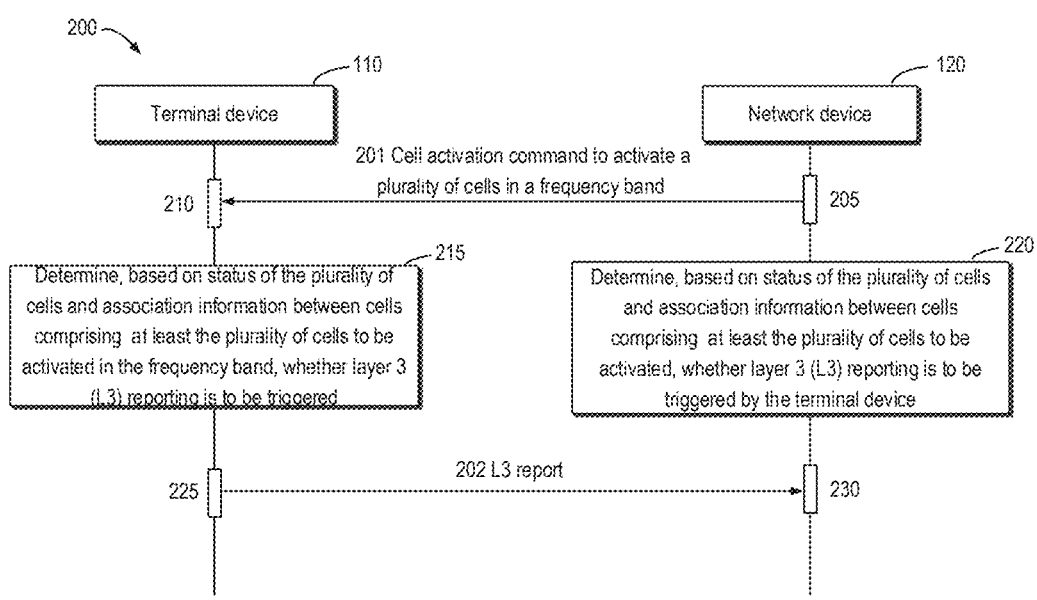
FIG. 2 illustrates an example signaling process for cell activation triggered L3 reporting according to some embodiments of the present disclosure.

FIG. 2 illustrates an example signaling process 200 for cell activation triggered L3 reporting according to some embodiments of the present disclosure. For the purpose of discussion, the process 200 will be described with reference to FIG. 1. The process 200 may involve the terminal device 110, the network device 120 as illustrated in FIG. 1. It would be appreciated that although the process 200 has been described in the communication environment 100 of FIG. 1, this process may be likewise applied to other communication scenarios with similar issues.

As shown in FIG. 2, the network device 120 transmits (205), to the terminal device 110, a cell activation command 201 to activate a plurality of cells in a frequency band, and the terminal device 110 receives (210) the cell activation command 201. In some embodiments, the plurality of cells are a plurality of secondary cells (SCells) (for example, 120-2 and 120-3 as shown in FIG. 1) on a same frequency band to be activated by the cell activation command 201. The terminal device 110 determines (215), based on status of the plurality of cells and association information between cells comprising at least the plurality of cells to be activated in the frequency band, whether layer 3 (L3) reporting is to be triggered. The association information is defined between the cells on the same frequency band, and the cells comprise at least the plurality of cells to be activated, and the cells may also comprise the active serving cells, if any. That is to say, the association information is defined between the cells to be activated as well as between the cell to be activated and the active serving cell, if any. Since the network device 120 and the terminal device 110 are aligned with each other on the information, such as the status of the plurality of cells and association information, the network device 120 also determines (220), based on status of the plurality of cells and association information between cells comprising at least the plurality of cells to be activated in the frequency band, whether layer 3 (L3) reporting is to be triggered by the terminal device 110 accordingly. Based on determining that the L3 reporting is to be triggered, the terminal device 110 transmits (225) an L3 report 202, and the network device 120 receives (230) the L3 report 202.

In some embodiments, the frequency band is in a first frequency range, and the first frequency range may comprise frequency range 1 (FR1). The terminal device 110 or the network device 120 determines the L3 reporting is to be triggered by the terminal device 110 based on determining that (i) at least one cell among the plurality of cells is unknown, and (ii) there is no active serving cell contiguous to the at least one cell that is unknown among the plurality of cells; and (iii) there is no known to-be-activated cell contiguous to the at least one cell that is unknown among the plurality of cells. In these embodiments, there is no active serving cell which is contiguous to the at least one unknown cell, and there is no known to-be-activated cell which is contiguous to the at least one unknown cell.

In some embodiments, the terminal device 110 or the network device 120 determines that the L3 report is to be triggered by the terminal device 110 further based on determining that a valid L3 measurement result for at least one unknown cell is available. In some embodiments, known status of a first specific cell indicates that a valid L3 measurement result for the first specific cell has been reported by the terminal device 110 to the network device within a certain time period before receiving the cell activation command; and unknown status of a second specific cell indicates that a valid L3 measurement result for the second specific cell is not available, or the valid L3 measurement result for the second specific cell is available but has not been reported by the terminal device 110 to the network device within a certain time period before receiving the cell activation command.

In some embodiments, the plurality of cells may be configured by the network device to be contiguous, which means that the plurality of cells share a common measurement result, for example, for SSB synchronization signal/PBCH block (SSB), and if one of the contiguous cells is activated, the other cells of the contiguous cells can be determined to be activated without additional efforts accordingly. In these embodiments in which the plurality of cells are contiguous, the terminal device 110 or the network device 120 may determine that the L3 reporting is to be triggered by the terminal device at least based on determining that the plurality of cells are all unknown, there is no active serving cell in the frequency band contiguous to any unknown cell, and valid L3 measurement result for at least one unknown cell is available. In these embodiments, since the terminal device 110 has valid L3 measurement results for at least one of the unknown cells, the L3 reporting is triggered, and no further cell search or cell detection is needed for either of the plurality of cells, since the plurality of cells are contiguous. The example instance for these embodiments will be described in details with reference to FIG. 3.

In some embodiments, the plurality of cells on the same frequency band may be configured by the network device to be non-contiguous. In these embodiments in which the plurality of cells are configured to be non-contiguous, the terminal device 110 or the network device 120 may determine that the L3 reporting is to be triggered by the terminal device at least based on determining that at least one cell of the plurality of cells is unknown, there is no active serving cell contiguous to the at least one unknown cell in the frequency band, and there is no known cell contiguous to the at least one unknown cell in the frequency band, and valid L3 measurement result for at least one unknown cell is available. In these embodiments, for any cell which valid L3 measurement result is not available, cell detection and L1 RSRP measurement will be performed as the plurality of cells are non-contiguous. The example instance for these embodiments will be described in details with reference to FIG. 4.

In some embodiments, the frequency band is a second frequency range, and the second frequency range may comprise frequency range 2 (FR2), and the terminal device 110 or network device 120 determine that the L3 reporting is to be triggered by the terminal device based on determining that (i) all the plurality of cells are unknown, and (ii) there is no active serving cell in the frequency band. In some embodiments, the terminal device 110 or the network device 120 determines that the L3 report is to be triggered by the terminal device further based on determining that valid L3 measurement result for at least one unknown cell is available.

In these embodiments, the plurality of cells on the FR2 may be contiguous. In these embodiments in which the plurality of cells are in the FR2, the terminal device 110 or the network device 120 may determine that the L3 reporting is to be triggered at least based on determining that the plurality of cells are all unknown, there is no active serving cell in the frequency band for any unknown cell, and valid L3 measurement result for at least one unknown cell is available.

In process 200, the scenario where multiple cells are being activated in a cell activation command, and the multiple cells are on the same band, for example, in FR1 or FR2. The terminal device sends an L3 report after cell activation command, which includes the L3 measurement results of all serving cells if available. By considering the cell status e.g. known/unknown, and the association information among the cells on the same band, the terminal device may determine if L3 reporting is to be triggered for cells on different frequency bands, for example, on frequency range 1(FR1) and frequency range 2(FR2), respectively. If the conditions are fulfilled the terminal device may trigger the L3 reporting if there is valid measurement result for at least one unknown to-be-activated cell, and hence achieves a faster cell activation. Otherwise, the terminal device would not trigger L3 reporting and a cell activation delay is expected.

Further, the conditions for determination are defined for FR1 and FR2 band cases separately, and thus the terminal device may also consider the frequency band. With the assumption of "all to-be-activated SCells are on the same band", the following case 1 and case 2 are to be considered for FR1 and FR2 bands separately.

For the case 1 that all to-be-activated SCells are on the same FR2 band, as L3 report is needed only for activating unknown SCell, all the to-be-activated SCells need to be unknown, and for any of the to-be-activated unknown SCell, there is no active serving cells on the same band. Otherwise, cell detection would not be needed on the FR2 band. Hence, if all to-be-activated SCells are on the same FR2 band, the UE may determine to transmit a L3 report when "all the to-be-activated SCells are unknown" and "for any of the to-be-activated unknown SCell, there is no active serving cells on the same band".

For the case 2 that all to-be-activated SCells are on the same FR1 band, this is different from the scenario of FR2 band in that the SCells on one FR1 band may be non-contiguous, and hence some to-be-activated unknown SCells may still need cell detection even if there is non-contiguous active serving cell on the band. Therefore, UE is expected to trigger the L3 report after SCell activation as long as there is at least one unknown to-be-activated SCell and there is no active serving cell or known to-be-activated SCell contiguous to the SCell on the same band. That is, if all to-be-activated SCells are on the same FR1 band, the UE may determine to transmit a L3 report when "there is at least one unknown to-be-activated SCell and there is no active serving cell or known to-be-activated SCell contiguous to the SCell (i.e. the at least one unknown SCell) on the same band".

In addition, for the above cases 1 and 2, another condition is needed that the UE shall have valid L3 measurement result for at least one unknown to-be-activated SCell on the band. With the proposed solution, UE is able to determine the SCell activation behaviour i.e. with or without L3 reporting, based on the status of multiple SCells including to-be-activated SCells and the other active serving cells. As network is aligned with UE on the information, and hence it is ready to schedule the UE earlier once SCell is activated with L3 reporting.

Hereinafter, some embodiments provide examples on how the UE determines if to trigger L3 reporting based on the cell status of the plurality of cells on the same band and association information. In the examples, two SCells are assumed on the same FR1 band and UE is assumed to have valid L3 measurement results for at least one unknown SCell.

Based on the proposed conditions, the UE can determine if to trigger L3 reporting based on the known/unknown status of multiple SCells to be activated, and the association information between the cells.

TABLE 1

Example of conditions for determining L3 reporting reporting

| SCell1 (CC1) | SCell2 (CC2) | Association info | L3 reporting triggered | Number of cell detection (N1) |
|---|---|---|---|---|
| Known | Known | contiguous | No | 0 |
| Known | Unknown | contiguous | No | 0 |
| Unknown | Unknown | contiguous | Yes | 0 or 1 |
| Known | Known | Non-contiguous | No | 0 |
| Known | Unknown | Non-contiguous | Yes | 0 |
| Unknown | Unknown | Non-contiguous | Yes | 0, or 1 |

As shown in above Table 1, for the scenario in which SCell1 and SCell2 are contiguous on one FR1 band, only when all SCells on the same frequency band are all unknown, for example both SCell1 and SCell2 are unknown, as shown in row 3, the L3 reporting will be triggered. For the scenario in which SCell1 and SCell2 are contiguous, as long as one SCell on the same frequency band is known, such as in row 1 and row 2, the L3 reporting will not be triggered.

For the scenario in which all SCells on the same FR1 frequency band are non-contiguous, as shown in rows 4 to 6, if at least one of the SCells is unknown, for example, SCell2 is unknown, the L3 reporting will be triggered.

Figure 3:
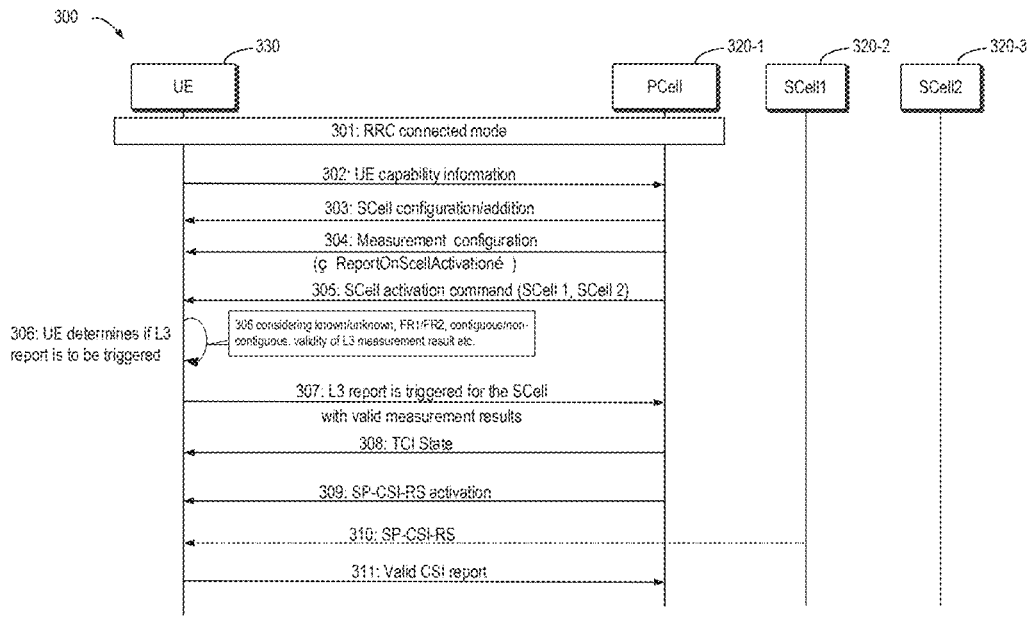
FIG. 3 illustrates an example signaling process for multiple SCell activation with contiguous unknown SCells on the same band according to some embodiments of the present disclosure.

FIG. 3 illustrates an example signaling process 300 for multiple SCell activation with contiguous unknown SCells on the same band (for example, FR1) according to some embodiments of the present disclosure. In the illustrated example, all the SCells are assumed to be on the same FR1 band and unknown, i.e. cell detection is needed, and there is not any active cell on the same FR1 band, and the assumption is that the SCells are contiguous (i.e. there is association information between the cells).

As shown in FIG. 3, the UE is configured with PCell 320-1, SCell1 320-2 and SCell2 320-3 in connected mode and only PCell is activated. As shown in FIG. 3, at 301, the UE 330 is in connected mode, for example RRC connected mode. At 302, the UE 330 indicates to the network (for example, PCell 320-1) the capability of supporting SCell activation triggered L3 reporting for SCell activation. At 303, the UE 330 receives SCell reconfiguration/addition command from the network (for example, PCell 320-1). At 304, the UE 330 receives measurement configuration considering its capability of supporting L3 reporting via the ReportOnScellactivation information element from the network (for example, PCell 320-1). At 304, the IE (ReportOnScellActivation-r18) will be indicated to the UE 330 to indicate the UE is allowed to send L3 reporting after SCell activation command. At 305, the UE 330 receives SCell activation command on a MAC CE from the network (for example, PCell 320-1) to activate two SCells i.e. SCell1 and SCell2.

As shown in FIG. 3, at 306, the UE 330 determines whether the condition is met for SCell activation, and the condition may comprise that, for example, to-be-activated SCell(s) are unknown in the same FR1 band, there is no active serving cell(s) or known to-be-activated SCell(s) which are contiguous to the unknown to-be-activated SCells in the same band, and also the SCells are contiguous. For example, the condition may comprise that all the SCells are assumed to be on the same FR1 band and unknown, and there is not any active serving cell on the same FR1 band, and the SCells are contiguous.

If the condition mentioned above is stratified and there is a valid L3 measurement result for at least one unknown to-be-activated SCell on the band, at 307, the UE 330 sends, to the network (for example, PCell 320-1), a valid L3 report for at least one of the unknown SCells e.g. SCell1, for which there is a valid L3 measurement report. As the two SCells are contiguous, the network (for example, PCell 320-1) may determine the transmission configuration indicator (TCI) based on the L3 report for both SCells, and hence there is no need for any cell detection even if the UE 330 has not valid measurement result for SCell2.

At 308, the network (for example, PCell 320-1) sends TCI state to the UE 330. At 309, the network (for example, PCell 320-1) sends CSI RS activation command to the UE 330. At 310, the UE 330 measures the corresponding CSI RS(s). At 311, the UE 330 sends a valid CSI report to the network (for example, PCell 320-1).

In the process 300, all the SCells are assumed to be on the same FR1 band and unknown, i.e. cell detection is needed. There is not any active cell on the same FR1 band. The assumption is that the SCells are contiguous (i.e. there is association information between the cells). If the UE has valid L3 measurement results for at least one of the SCells, the L3 reporting is triggered, and no further cell search is needed for either of the SCells. Therefore, for all unknown SCells, a faster SCell activation can be achieved. Otherwise, the UE perform cell detection for at least one of the SCells.

As for the number of cell detection "1" in row 3 of above Table 1, it may mean that for some UE implementations, after the L3 measurement result for SCell1 is reported, the UE is not capable of updating the status for the SCell2 in time according to the association information between them, and the cell detection for SCell2 is still performed. However, for the UE capable of updating the status for SCell2 in time according to the association information between SCell1 and SCell2, the number of cell detection is 0, which means that no further cell search is needed for either of the SCells.

Figure 4:
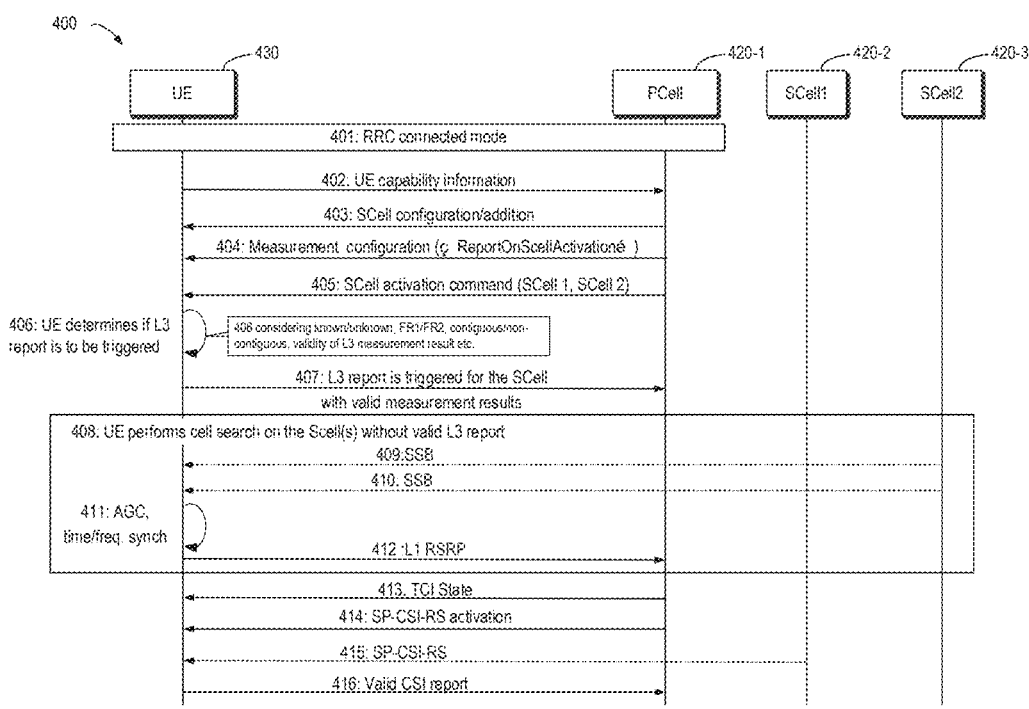
FIG. 4 illustrates an example signaling process for multiple SCell activation with non-contiguous unknown SCells on the same band according to example embodiments of the present disclosure.

FIG. 4 illustrates an example signaling process 400 for multiple SCell activation with non-contiguous unknown SCells on the same band according to some embodiments of the present disclosure. In the process 400, the UE is configured with PCell 420-1, SCell1 420-2 and SCell2 420-3 in connected mode and only PCell is activated. The plurality of SCells are assumed to be on the same FR1 band and non-contiguous, and at least one of them is unknown, i.e. cell detection is needed.

As shown in FIG. 4, at 401, the UE 430 is in connected mode, for example, RRC connected mode. At 402, the UE 430 indicates the capability of supporting L3 reporting for SCell activation to the network (for example, PCell 420-1). At 403, the UE 430 receives SCell configuration/addition command from the network (for example, PCell 420-1). At 404, the UE 430 receives measurement configuration considering its capability of supporting L3 reporting from the network (for example, PCell 420-1) via the IE (ReportOnScellActivation-r18). At 405, the UE 430 receives SCell activation command on a MAC CE from the network (for example, PCell 420-1) to activate two SCells i.e. SCell1 420-2 and SCell2 420-3.

As shown in FIG. 4, at 406, the UE 430 determines whether the condition is met for SCell activation, and the condition comprises, for example, SCell(s) are unknown, non-contiguous in the same FR1 band, there is no active serving cell(s) or known to-be-activated SCell(s) which are contiguous to the unknown to-be-activated SCells in the same band. For example, the condition may comprise at least one SCell is unknown, the SCells in the same FR1 band are non-contiguous, and no active serving cell(s) or known to-be-activated SCell(s) contiguous to the at least one unknown SCell exists in the same band.

If the condition mentioned above is stratified and there is a valid L3 measurement result for at least one unknown to-be-activated SCell on the band, at 407, the UE 430 sends valid L3 report for one of the unknown SCells e.g. SCell1, for which there is a valid L3 measurement report.

At 408, for any SCell e.g. SCell2 which valid L3 report is not available, cell detection and L1 RSRP measurement will be performed as the two SCells are non-contiguous. For example, at 409 and 410, the UE 430 receives several SSBs from the SCell2 such that the UE 430 may obtain the identification of the SCell2 by detecting the SSBs and then achieve downlink synchronization in the time domain and frequency domain with the SCell2. At 411, the UE 430 performs downlink synchronization in the time domain and frequency domain with the SCell2. At 412, the UE 430 transmits the L1 RSRP measurement to the serving cell, For example, PCell. At 413, the the network (for example, PCell 420-1) sends TCI state to the UE 430. At 414, the network (for example, PCell 420-1) sends CSI RS activation command to the UE 430. At 415, the UE 430 measures the corresponding CSI RS(s). At 416, the UE 430 transmits a valid CSI report to the network (for example, PCell 420-1).

In the process 400, the SCells are assumed to be on the same FR1 band, non-contiguous, and at least one of them is unknown, i.e. cell detection is needed. There is not any active cell(s) or known to-be activated SCell on the same FR1 band which is contiguous to the unknown SCell. If the UE has valid L3 measurement results for any of the SCells, the L3 reporting is triggered, and no further cell search is needed for that SCell. Then, for the SCell for which valid L3 measurement result is not available, cell search is needed, as the SCells are not contiguous. Therefore, at least for the unknown Scell for which valid L3 measurement results is available, a faster SCell activation can be achieved.

As shown in above Table 1, row 5, the L3 measurement result for SCell1 has been reported to the network before receiving the SCell activation command, and thus SCell1 is known. However, for the SCell2, the L3 measurement result is valid or available but has not been reported to the network before the reception of the SCell activation command, and thus SCell2 is unknown. Since the SCell1 is known and after reporting the L3 measurement result for the unknown SCell 2, there is no need for any cell search or detection, and thus the number of Cell detection is 0, even SCell1 and SCell2 are non-contiguous.

As shown in above Table 1, row 6, if the L3 measurement results for SCell1 and SCell2 are both available but have not been reported to the network before the cell activation command, after reporting the L3 measurement results for SCell1 and SCell2, there is no need for any cell search or detection, and thus the number of Cell detection is 0. If the L3 measurement result for SCell1 is available but has been not reported to the network before the cell activation command, and the L3 measurement result for SCell2 is not available, after reporting the L3 measurement result for SCell1, there is a need for cell detection for SCell2 for which valid L3 report is not available, since SCell1 and SCell2 are non-contiguous.

In view of some embodiments of the present disclosure, some related content in TS38.133 clause 8.3.18 may be modified as follows, in which the underlined content (which means added content) and strike-through content (which means deleted content) may be changes to the related specifications or standards in view of some embodiments of the present disclosure.

8.3.18 SCell Activation Delay Requirement for Deactivated SCell with Multiple Downlink SCells with L3 Reporting The requirements in this clause shall apply for the UE configured with more than one SCell and supporting 13-MeasUnknownSCellActivation-r18. In EN-DC, NE-DC, standalone NR, or in one CG of NR-DC, the requirements in this clause shall apply when the following conditions are met:

UE only receives one single MAC command for multiple SCell activation within the activation period defined in this clause, and in each single CG, there are no other SCell activation, deactivation, addition or release before activation is completed for all the SCells activated by the single MAC CE in this clause, and in EN-DC and NE-DC, there are no E-UTRAN SCell activation, deactivation, addition or release before multiple SCell activation is completed in this clause, and all to-be-activated SCells are unknown on the same FR2 band, and for any of the to-be-activated unknown SCell, there is no active serving cells on the same band, or All to-be-activated SCells are on the same FR1 band, and there is at least one unknown to-be-activated SCell and there is no active serving cell or known to-be-activated SCell contiguous to the SCell on the same band, the UE reports valid L3 measurement results after receiving the SCell activation command for activating at least one unknown SCell.

In two CGs of NR-DC, the requirements in this clause shall apply when the following conditions are met:
  UE receives one MAC command per CG for multiple SCell activation within the activation period defined in this clause, and
  UE supports per-FR measurement gap capability, and
  all to-be-activated SCells are unknown on the same FR2 band, and for any of the to-be-activated unknown SCell, there is no active serving cells on the same band, or
  all to-be-activated SCells are on the same FR1 band, and there is at least one unknown to-be-activated SCell and there is no active serving cell or known to-be-activated SCell contiguous to the SCell on the same band,
  the UE reports valid L3 measurement results after receiving the SCell activation command for activating at least one unknown SCell.

Otherwise, Clause 8.3.7 is applied for UE who does not report L3 measurement results after receiving SCell activation command for activating multiple downlink SCells.

Figure 5:
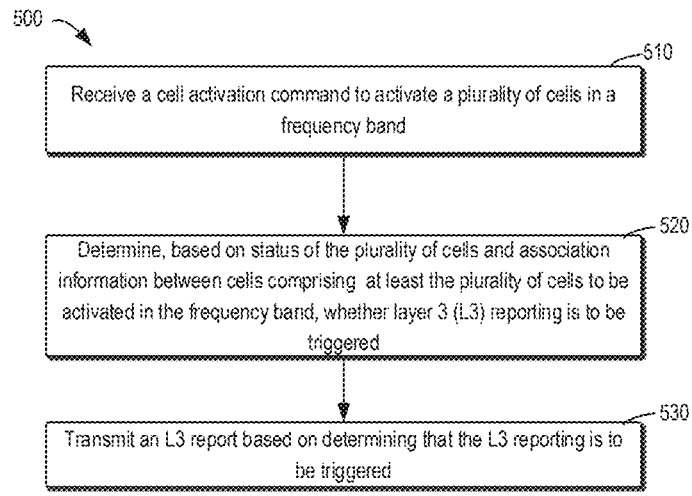
FIG. 5 illustrates an example flowchart of a method implemented at a terminal device according to example embodiments of the present disclosure.

FIG. 5 shows a flowchart of an example method 500 implemented at a terminal device (for example, the terminal device 110) in accordance with some embodiments of the present disclosure. For the purpose of discussion, the method 500 will be described from the perspective of the terminal device 110 with reference to FIG. 1.

At block 510, the terminal device 110 receives a cell activation command to activate a plurality of cells in a frequency band. At block 520, the terminal device 110 determines, based on status of the plurality of cells and association information between cells comprising at least the plurality of cells to be activated in the frequency band, whether layer 3 (L3) reporting is to be triggered. At block 530, the terminal device 110 transmits an L3 report based on determining that the L3 reporting is to be triggered.

In some embodiments, the frequency band is in a first frequency range, and the terminal device 110 may determine that the L3 reporting is to be triggered based on determining that (i) at least one cell among the plurality of cells is unknown, and (ii) there is no active serving cell contiguous to the at least one cell that is unknown among the plurality of cells, and (iii) there is no known to-be-activated cell contiguous to the at least one cell that is unknown among the plurality of cells, determining that the L3 reporting is to be triggered.

In some embodiments, the frequency band is a second frequency range, and the terminal device 110 may determine that the L3 reporting is to be triggered based on determining that (i) all the plurality of cells are unknown, and (ii) there is no active serving cell in the frequency band, determining that the L3 reporting is to be triggered.

In some embodiments, the plurality of cells in the frequency band comprises a plurality of secondary cells to be activated in the frequency band, and the association information indicates that the plurality of secondary cells share a common channel information and are contiguous, or the plurality of secondary cells do not share a common channel information and are non-contiguous.

In some embodiments, the terminal device 110 may trigger the L3 reporting based on determining that a valid L3 measurement result for at least one of the plurality of cells that is unknown is available. In some embodiments, known status of a first specific cell indicates that a valid L3 measurement result for the first specific cell has been reported to the network device within a certain time period before receiving the cell activation command; and unknown status of a second specific cell indicates that a valid L3 measurement result for the second specific cell is not available when receiving the cell activation command, or the valid L3 measurement result for the second specific cell is available but has not been reported to the network device within a certain time period before receiving the cell activation command.

In some embodiments, the L3 report is specific to an unknown cell for which valid L3 measurement result is available but has not been reported to the network device within a certain time period before receiving the cell activation command. In some embodiments, the first frequency range comprises frequency range 1 (FR1); or the second frequency range comprises frequency range 2 (FR2).

Figure 6:
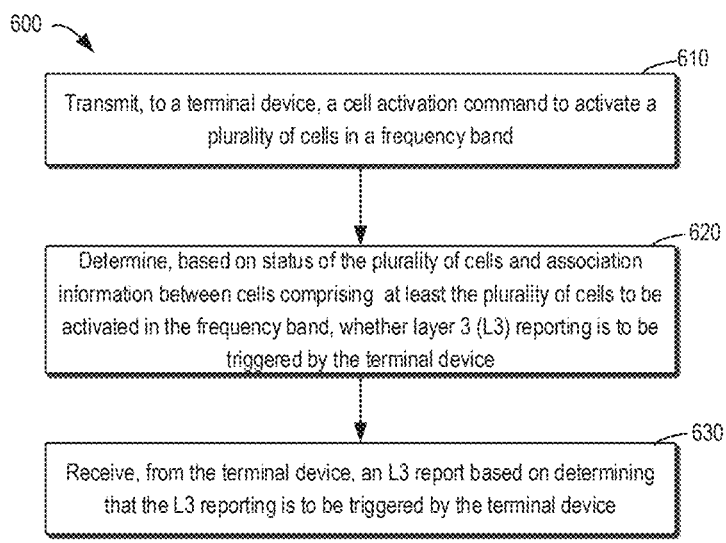
FIG. 6 illustrates an example flowchart of a method implemented at a network device according to example embodiments of the present disclosure.

FIG. 6 shows a flowchart of an example method 600 implemented at a network device (for example, the network device 120) in accordance with some embodiments of the present disclosure. For the purpose of discussion, the method 600 will be described from the perspective of the network device 120 with reference to FIG. 1.

At 610, the network device 120 transmits, to a terminal device, a cell activation command to activate a plurality of cells in a frequency band. At 620, the network device 120 determines, based on status of the plurality of cells and association information between cells comprising at least the plurality of cells to be activated in the frequency band, whether layer 3 (L3) reporting is to be triggered by the terminal device. At 630, the network device 120 receives, from the terminal device, an L3 report based on determining that the L3 reporting is to be triggered by the terminal device.

In some embodiments, the frequency band is in a first frequency range, and the network device may determine that the L3 reporting is to be triggered by the terminal device based on determining that (i) at least one cell among the plurality of cells is unknown, and (ii) there is no active serving cell contiguous to the at least one cell that is unknown among the plurality of cells, and (iii) there is no known to-be-activated cell contiguous to the at least one cell that is unknown among the plurality of cells, determining that the L3 reporting is to be triggered by the terminal device.

In some embodiments, the frequency band is a second frequency range, and the network device may determine that the L3 reporting is to be triggered by the terminal device based on determining that (i) all the plurality of cells are unknown, and (ii) there is no active serving cell in the frequency band, determining that the L3 reporting is to be triggered by the terminal device.

In some embodiments, the plurality of cells in the frequency band comprises a plurality of secondary cells to be activated in the frequency band, and the association information indicates that the plurality of secondary cells share a common channel information and are contiguous, or the plurality of secondary cells do not share a common channel information and are non-contiguous.

In some embodiments, the network device may determine that the L3 reporting is to be triggered by the terminal device based on determining that a valid L3 measurement result for at least one of the plurality of cells that is unknown is available.

In some embodiments, known status of a first specific cell indicates that a valid L3 measurement result for the first specific cell has been received from the terminal device within a certain time period before transmitting the cell activation command; and unknown status of a second specific cell indicates that a valid L3 measurement result for the second specific cell is not available when transmitting the cell activation command, or the valid L3 measurement result for the second specific cell is available but has not been received from the terminal device within a certain time period before transmitting the cell activation command.

In some embodiments, the L3 report is specific to an unknown cell for which valid L3 measurement result is available. In some embodiments, the first frequency range comprises frequency range 1 (FR1); or the second frequency range comprises frequency range 2 (FR2).

In some embodiments, an apparatus capable of performing any of operations of the method 500 (for example, the terminal device 110) may include means for performing the respective steps of the method 500. The means may be implemented in any suitable form. For example, the means may be implemented in a circuitry or software module.

In some embodiments, the apparatus may include means for receiving a cell activation command to activate a plurality of cells in a frequency band, means for determining, based on status of the plurality of cells and association information between cells comprising at least the plurality of cells to be activated in the frequency band, whether layer 3 (L3) reporting is to be triggered; and means for transmitting an L3 report based on determining that the L3 reporting is to be triggered.

In some embodiments, the frequency band is in a first frequency range, and the apparatus may determine that the L3 reporting is to be triggered based on determining that (i) at least one cell among the plurality of cells is unknown, and (ii) there is no active serving cell contiguous to the at least one cell that is unknown among the plurality of cells, and (iii) there is no known to-be-activated cell contiguous to the at least one cell that is unknown among the plurality of cells, determining that the L3 reporting is to be triggered.

In some embodiments, the frequency band is a second frequency range, and the apparatus may determine that the L3 reporting is to be triggered based on determining that (i) all the plurality of cells are unknown, and (ii) there is no active serving cell in the frequency band, determining that the L3 reporting is to be triggered.

In some embodiments, the plurality of cells in the frequency band comprises a plurality of secondary cells to be activated in the frequency band, and the association information indicates that the plurality of secondary cells share a common channel information and are contiguous, or the plurality of secondary cells do not share a common channel information and are non-contiguous.

In some embodiments, the apparatus may trigger the L3 reporting based on determining that a valid L3 measurement result for at least one of the plurality of cells that is unknown is available. In some embodiments, known status of a first specific cell indicates that a valid L3 measurement result for the first specific cell has been reported to the network device within a certain time period before receiving the cell activation command; and unknown status of a second specific cell indicates that a valid L3 measurement result for the second specific cell is not available when receiving the cell activation command, or the valid L3 measurement result for the second specific cell is available but has not been reported to the network device within a certain time period before receiving the cell activation command.

In some embodiments, the L3 report is specific to an unknown cell for which valid L3 measurement result is available but has not been reported to the network device within a certain time period before receiving the cell activation command. In some embodiments, the first frequency range comprises frequency range 1 (FR1); or the second frequency range comprises frequency range 2 (FR2).

In some embodiments, the apparatus further comprises means for performing other steps in some embodiments of the method 500. In some embodiments, the means comprises at least one processor and at least one memory including computer program code, the at least one memory and computer program code configured to, with the at least one processor, cause the performance of the apparatus.

In some embodiments, an apparatus capable of performing any of the method 600 (for example, the network device 120) may include means for performing the respective steps of the method 600. The means may be implemented in any suitable form. For example, the means may be implemented in a circuitry or software module.

In some embodiments, the apparatus may include means for transmitting to a terminal device, a cell activation command to activate a plurality of cells in a frequency band; means for determining, based on status of the plurality of cells and association information between cells comprising at least the plurality of cells to be activated in the frequency band, whether layer 3 (L3) reporting is to be triggered by the terminal device; and means for receiving, from the terminal device, an L3 report based on determining that the L3 reporting is to be triggered by the terminal device.

In some embodiments, the frequency band is in a first frequency range, and the apparatus may determine that the L3 reporting is to be triggered by the terminal device based on determining that (i) at least one cell among the plurality of cells is unknown, and (ii) there is no active serving cell contiguous to the at least one cell that is unknown among the plurality of cells, and (iii) there is no known to-be-activated cell contiguous to the at least one cell that is unknown among the plurality of cells, determining that the L3 reporting is to be triggered by the terminal device.

In some embodiments, the frequency band is a second frequency range, and the apparatus may determine that the L3 reporting is to be triggered by the terminal device based on determining that (i) all the plurality of cells are unknown, and (ii) there is no active serving cell in the frequency band, determining that the L3 reporting is to be triggered by the terminal device.

In some embodiments, the plurality of cells in the frequency band comprises a plurality of secondary cells to be activated in the frequency band, and the association information indicates that the plurality of secondary cells share a common channel information and are contiguous, or the plurality of secondary cells do not share a common channel information and are non-contiguous.

In some embodiments, the apparatus may determine that the L3 reporting is to be triggered by the terminal device based on determining that a valid L3 measurement result for at least one of the plurality of cells that is unknown is available.

In some embodiments, known status of a first specific cell indicates that a valid L3 measurement result for the first specific cell has been received from the terminal device within a certain time period before transmitting the cell activation command; and unknown status of a second specific cell indicates that a valid L3 measurement result for the second specific cell is not available when transmitting the cell activation command, or the valid L3 measurement result for the second specific cell is available but has not been received from the terminal device within a certain time period before transmitting the cell activation command.

In some embodiments, the L3 report is specific to an unknown cell for which valid L3 measurement result is available. In some embodiments, the first frequency range comprises frequency range 1 (FR1); or the second frequency range comprises frequency range 2 (FR2).

In some embodiments, the apparatus further comprises means for performing other steps in some embodiments of the method 600. In some embodiments, the means comprises at least one processor and at least one memory including computer program code, the at least one memory and computer program code configured to, with the at least one processor, cause the performance of the apparatus.

Figure 7:
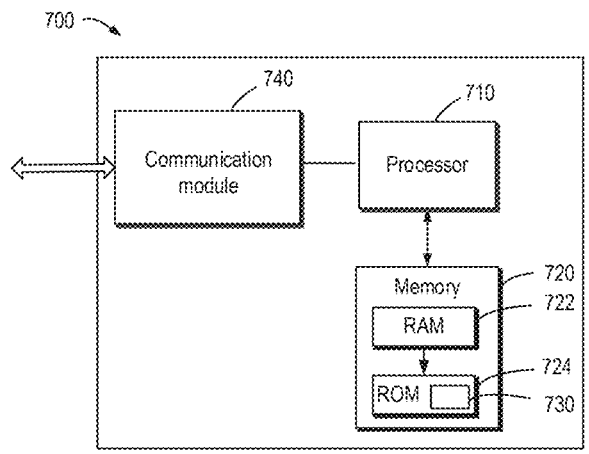
FIG. 7 illustrates an example simplified block diagram of an apparatus that is suitable for implementing embodiments of the present disclosure.

FIG. 7 is a simplified block diagram of a device 700 that is suitable for implementing embodiments of the present disclosure. The device 700 may be provided to implement the communication device, for example the terminal device 110 and the network device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a read only memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program so that the device 700 may perform any process of the disclosure as discussed with reference to FIGS. 2, 3, and 4. The embodiments of the present disclosure may also be implemented by hardware or by a combination of software and hardware.

Figure 8:
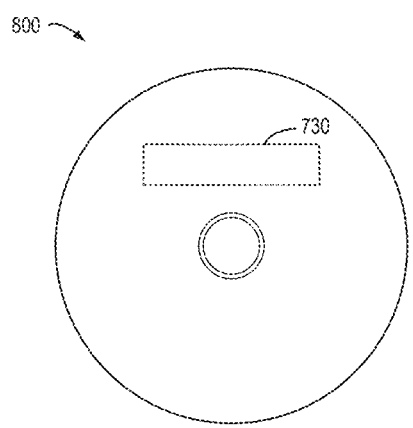
FIG. 8 illustrates an example block diagram of an example computer readable medium in accordance with some embodiments of the present disclosure.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out process 200, 300, or 400, the method 500 or 600 as described above with reference to FIG. 2, FIG. 3, FIG. 4, FIG. 5, or FIG. 6 Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:
   at least one processor; and
   at least one memory storing instructions that, when executed by the at least one processor, cause the terminal device at least to:
     receive a cell activation command to activate a plurality of cells in a frequency band, wherein the frequency band is in a first frequency range;
     determine, based on status of the plurality of cells and association information between cells comprising at least the plurality of cells to be activated in the frequency band, whether layer 3 (L3) reporting is to be triggered, wherein, based at least on determining that (i) at least one cell among the plurality of cells is unknown, and (ii) there is no active serving cell contiguous to the at least one cell that is unknown among the plurality of cells, and (iii) there is no known cell contiguous to the at least one cell that is unknown among the plurality of cells, the L3 reporting is determined to be triggered; and
     transmit an L3 report based on determining that the L3 reporting is to be triggered.

2. The terminal device of claim 1, wherein:
   the plurality of cells in the frequency band comprises a plurality of secondary cells to be activated in the frequency band, and
   the association information indicates that the plurality of secondary cells share a common channel information and are contiguous, or the plurality of secondary cells do not share a common channel information and are non-contiguous.

3. The terminal device of claim 1, wherein the L3 reporting is determined to be triggered further based on determining that a valid L3 measurement result for at least one of the plurality of cells that is unknown is available.

4. The terminal device of claim 1, wherein:
   known status of a first specific cell indicates that a valid L3 measurement result for the first specific cell has been reported to the network device within a certain time period before receiving the cell activation command; and
   unknown status of a second specific cell indicates that a valid L3 measurement result for the second specific cell is not available when receiving the cell activation command, or the valid L3 measurement result for the second specific cell is available but has not been reported to the network device within a certain time period before receiving the cell activation command.

5. The terminal device of claim 1, wherein the L3 report is specific to an unknown cell for which valid L3 measurement result is available but has not been reported to the network device within a certain time period before receiving the cell activation command.

6. The terminal device of claim 1, wherein the cell activation command comprises a single medium access control (MAC) command for multiple secondary cell (SCell) activation within an activation period.

7. The terminal device of claim 6, wherein the cell activation command is received in one of the following scenarios:
   evolved universal terrestrial radio access network (E-UTRAN)-new radio (NR) double connection (EN-DC),
   NR-E-UTRAN double connection (NE-DC),
   standalone NR, or
   one cell group (CG) of NR-DC.

8. The terminal device of claim 1, wherein the terminal device is caused to determine that in each group of cells of the plurality of cells, grouped in accordance with the association information, there is no other SCell activation, deactivation, addition or release before activation is completed for all SCells activated by a single MAC control element (CE).

9. The terminal device of claim 1, wherein the terminal device is caused to determine that in EN-DC and NE-DC, there are no E-UTRAN SCell activation, deactivation, addition or release before multiple SCell activation is completed.

10. The terminal device of claim 1, wherein the cell activation command comprises one MAC command per CG for multiple SCell activation within an activation period.

11. The terminal device of claim 10, wherein the cell activation command is received in a scenario of two CGs of NR-DC.

12. The terminal device of claim 10, wherein the terminal device is caused to determine that the terminal device supports per-frequency-range measurement gap capability.

13. A network device, comprising:
   at least one processor; and
   at least one memory storing instructions that, when executed by the at least one processor, cause the network device at least to:
     transmit, to a terminal device, a cell activation command to activate a plurality of cells in a frequency band, wherein the frequency band is in a first frequency range;
     determine, based on status of the plurality of cells and association information between cells comprising at least the plurality of cells to be activated in the frequency band, whether layer 3 (L3) reporting is to be triggered by the terminal device, wherein, based at least on determining that (i) at least one cell among the plurality of cells is unknown, and (ii) there is no active serving cell contiguous to the at least one cell that is unknown among the plurality of cells, and (iii) there is no known cell contiguous to the at least one cell that is unknown among the plurality of cells, the L3 reporting is determined to be triggered by the terminal device; and receive, from the terminal device, an L3 report based on determining that the L3 reporting is to be triggered by the terminal device.

14. The network device of claim 13, wherein:
the plurality of cells in the frequency band comprises a plurality of secondary cells to be activated in the frequency band, and
the association information indicates that the plurality of secondary cells share a common channel information and are contiguous, or the plurality of secondary cells do not share a common channel information and are non-contiguous.

15. The network device of claim 13, wherein:
known status of a first specific cell indicates that a valid L3 measurement result for the first specific cell has been received from the terminal device within a certain time period before transmitting the cell activation command; and
unknown status of a second specific cell indicates that a valid L3 measurement result for the second specific cell is not available when transmitting the cell activation command, or the valid L3 measurement result for the second specific cell is available but has not been received from the terminal device within a certain time period before transmitting the cell activation command.

16. The network device of claim 13, wherein the L3 report is specific to an unknown cell for which valid L3 measurement result is available.

17. A method comprising:
receiving a cell activation command to activate a plurality of cells in a frequency band, wherein the frequency band is in a first frequency range;
determining, based on status of the plurality of cells and association information between cells comprising at least the plurality of cells to be activated in the frequency band, whether layer 3 (L3) reporting is to be triggered, wherein, based at least on determining that (i) at least one cell among the plurality of cells is unknown, and (ii) there is no active serving cell contiguous to the at least one cell that is unknown among the plurality of cells, and (iii) there is no known cell contiguous to the at least one cell that is unknown among the plurality of cells, the L3 reporting is determined to be triggered; and
transmitting an L3 report based on determining that the L3 reporting is to be triggered.

18. The method of claim 17, wherein the L3 reporting is determined to be triggered further based on determining that a valid L3 measurement result for at least one of the plurality of cells that is unknown is available.

19. The method of claim 17, wherein the cell activation command comprises a single medium access control (MAC) command for multiple secondary cell (SCell) activation within an activation period.

20. The method of claim 17, wherein the cell activation command comprises one MAC command per CG for multiple SCell activation within an activation period.

* * * * *